United States Patent [19]

Haesloop

[11] 4,080,106

[45] Mar. 21, 1978

[54] PURGED VALVE ASSEMBLY AND METHOD OF SEALING

[75] Inventor: William G. Haesloop, Dana Point, Calif.

[73] Assignee: International Telephone and Telegraph Corporation, New York, N.Y.

[21] Appl. No.: 648,264

[22] Filed: Jan. 12, 1976

[51] Int. Cl.² ........................ F04B 35/04; G01F 11/00
[52] U.S. Cl. ........................................ 417/53; 417/360; 222/333
[58] Field of Search ........................ 417/360; 222/333

[56] References Cited

U.S. PATENT DOCUMENTS

| | | | |
|---|---|---|---|
| 3,369,715 | 2/1968 | Carter | 222/333 |
| 3,512,546 | 5/1970 | King | 137/312 |
| 3,876,120 | 4/1975 | Haesloop | 222/333 |
| 3,963,381 | 6/1976 | Kohen | 417/360 |

Primary Examiner—William L. Freeh
Attorney, Agent, or Firm—Thomas L. Peterson

[57] ABSTRACT

A purged valve assembly and method of sealing for a liquid transmitting casing that extends into a storage reservoir for liquid or liquified gases. The assembly includes a normally closed spring-biased foot valve mounted on the lower end of the casing. A pump and motor unit slidably mounted in the casing opens the foot valve when resting thereon. A purged double seal on the foot valve prevents any leakage of liquid or liquified gas inwardly through the valve into the interior of the casing when the pump and motor unit is lifted off the foot valve.

12 Claims, 6 Drawing Figures

4,080,106

PURGED VALVE ASSEMBLY AND METHOD OF SEALING

BACKGROUND OF THE INVENTION

The present invention relates generally to a method and system for pumping fluids and, more particularly, to a submersible pumping system for filling and discharging a fluid reservoir such as the hull of a cargo ship or a land-based storage vessel for liquified gases.

The present invention constitutes an improvement upon the submersible pumping systems disclosed in U.S. Pat. No. 3,369,715 to James C. Carter, and U.S. Pat. No. 3,876,120 to William G. Haesloop. In such systems a pump and motor unit is lowered into a vertical casing extending through a storage reservoir for liquified gases. The unit trips a normally closed foot valve at the bottom of the casing to communicate the pump inlet with the liquid in the reservoir. The centrifugal pump of the unit pumps the liquid into the casing where it flows upwardly to an outlet port at the top of the casing. When the unit is raised off the foot valve, the foot valve closes sealing the casing from the reservoir so that the unit may be removed for repair or replacement.

In the aforementioned systems, there may be a small degree of leakage of liquid or gas from the reservoir through the foot valve to the casing interior when the foot valve is closed. In some applications, it is essential or desirable that no such leakage exist or that such leakage be reduced to an absolute practical minimum. It is the purpose of the present invention to provide an extremely low leakage foot valve which will prevent the loss of any liquid or liquified gas in the casing and prevent any possible hazards of venting flamable gases to the local atmosphere when the casing top has been opened.

SUMMARY OF THE INVENTION

According to the principal aspect of the present invention, a foot valve for a storage reservoir casing is provided with a purged double seal which prevents any leakage of liquid or liquified gas from the reservoir through the foot valve to the interior of the casing. The double seal comprises a pair of substantially concentric annular sealing lips spaced from each other to provide an annular space therebetween. A port provides flow communication between such annular space and a source of purge gas, such as nitrogen or helium. When the pump and motor unit is lifted off the foot valve to allow the valve to become closed, the purge gas is conveyed from the source through the port to the space between the sealing lips of the double seal, thereby preventing any leakage of gas from the reservoir through the foot valve to the casing and from there to the external environment. Thus, by the present invention, there is provided a zero leakage foot valve for the discharge casing of a fluid storage reservoir.

DESCRIPTION OF THE PREFERRED EMBODIMENTS

Figure 1:
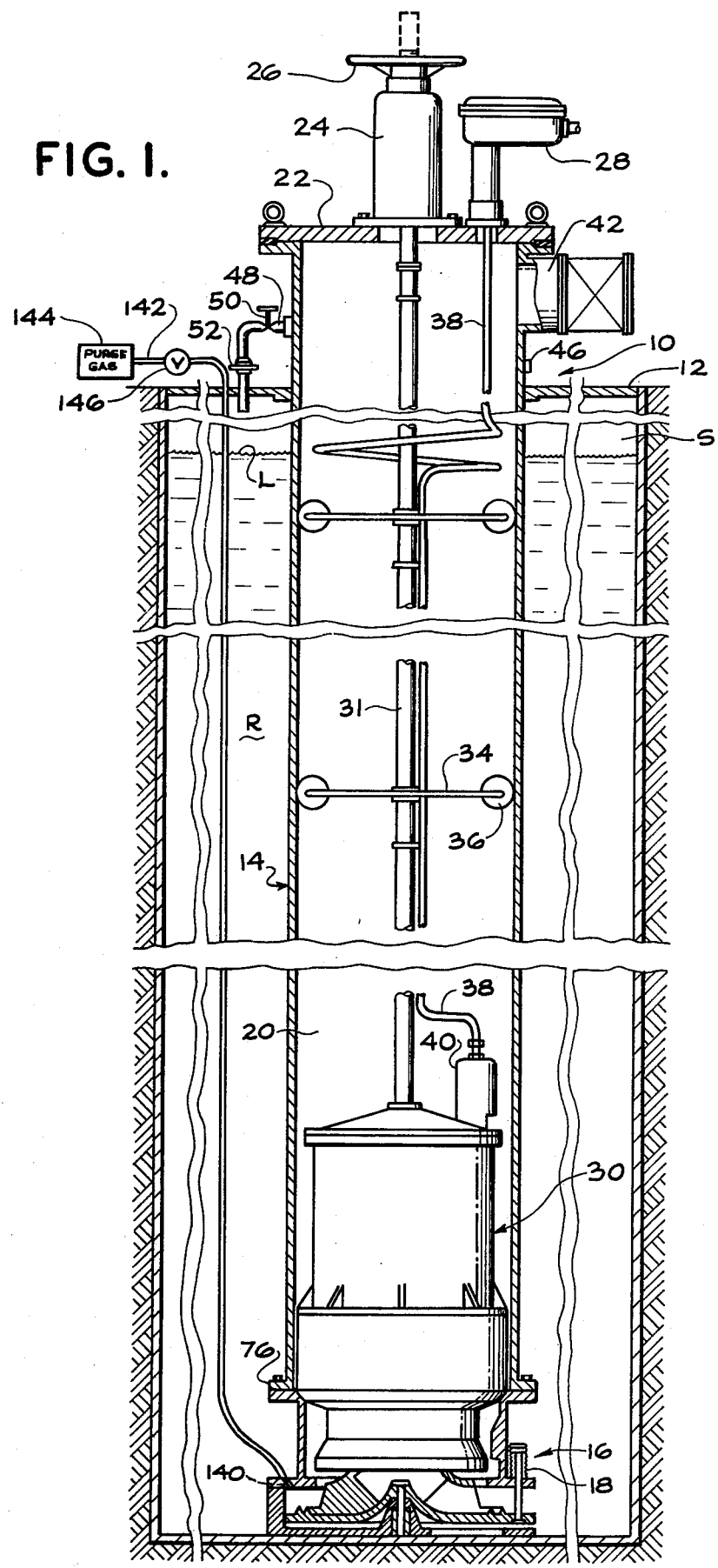
FIG. 1 is a fragmentary, broken, somewhat diagrammatic vertical sectional view of a storage reservoir equipped with a discharge casing having a foot valve at its lower end constructed in accordance with the present invention, the valve being shown in its open position.

Referring now to FIG. 1 in detail, the reference numeral 10 designates a storage tank, such as the hull of a ship or a land-based storage vessel or the like, providing a reservoir R for liquified gas or cryogenic material such as natural gas, methane, butane, propane, ammonia, ethylene, or other liquid media whose leakage into the casing is to be controlled. The liquid level of the liquified material in the reservoir R is shown close to the roof 12, as illustrated at L, and the space S between the top of the liquid and the roof 12 is filled with gas boiling off from the liquid and pressurizing the reservoir to the vapor pressure of the liquid at the applicable temperature.

A cylindrical casing or tube 14 extends vertically through the tank 10 from the top to the bottom thereof and extends above the roof 12 as shown. The bottom of the casing carries a foot valve 16 normally biased to a closed position by springs 18 and effective to seal off the interior 20 of the casing from the reservoir R.

The top of the casing 14 is closed by a cover 22 carrying a sealing gland which is raised and lowered by a hand wheel 26 or some other means. The cover also carries a junction box 28 for an electrical connection.

A pump and motor unit 30 is suspended in the casing 14 from the sealing gland 24 by tension member 31 which may be tubing, pipe or cable. Spring loaded guides 34 with roller 36 on their ends or alternate centering means may be mounted at intervals on the tension member 31 to guide it centrally in the casing 14.

The junction box 28 is connected through a cable 38 to a junction box 40 on the top of the unit 30 for supplying electrical current to the motor of the unit.

When the unit 30 is lowered to the bottom of the casing 14, it rests on the foot valve 16. The weight of the unit may be sufficient alone to open the foot valve, as seen in FIG. 1, and liquid from the reservoir R will flow to the inlet of the pump to be propelled through the unit out of the annular opening therearound, filling the casing 14 and discharging through an outlet port 42 at the top end of the casing. Should the static head of liquid acting across the foot valve seal area cause a sealing force greater than the weight of the pump, inert gas pressure may be added to the casing until its pressure plus the pump weight is sufficient to open the valve. A valve 44 is provided in the outlet port 42. When the hand wheel 26 is manipulated through the sealing gland 24, the unit 30 is lifted off the foot valve 16, whereupon the springs 18 close the valve sealing off the interior of the casing 14 from the reservoir R. Liquid gaseous fluid in the sealed off casing can be purged therefrom back to the reservoir R by introducing a purging gas, such as nitrogen, through an inlet connection 46. The foot valve will permit purging of the pump casing with inert gas prior to removal of the pump and maintenance of inert gas atmosphere in the casing once the pump is removed. A pipeline 48 connects the casing with the top of the reservoir R. Shutoff valve 50 in this pipeline prevents backflow during the pumping operation. Further, a check-and-vent valve 52 in the pipeline 48 vents the casing 14 when valve 50 is open following a pump shutdown which could cause considerable liquid evaporation for certain style pumps. The structure and operation of the assembly shown in FIG. 1 is more fully described in the aforesaid Carter and Haesloop patents. Reference is also made to U.S. Pat. No. 3,652,186 to James C. Carter which describes a preferred pump and motor unit for use in the system.

Figure 2:
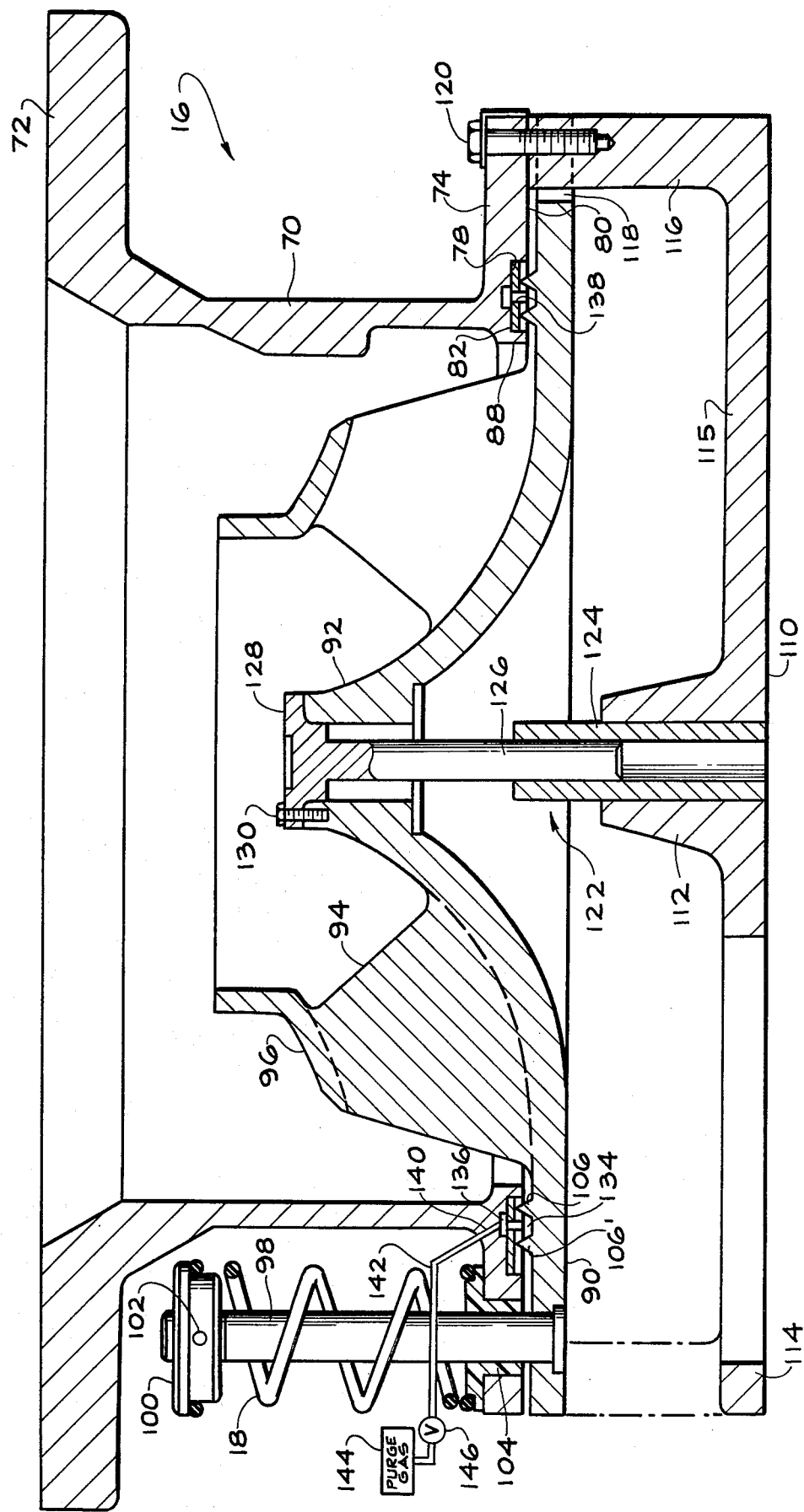
FIG. 2 is an enlarged partial sectional view of the foot valve illustrated in FIG. 1, but shown in its normally closed position.

Reference is now made to FIG. 2 which illustrates the details of structure of the foot valve 16 of the present invention. The valve is mounted in a generally cylindrical housing 70 formed within an upper outwardly extending flange 72 and a lower outwardly extending flange 74. The flange 72 is fixed to an outwardly extending flange 76 on the lower end of the casing 14 by suitable connecting means, not shown. An annular recess 78 is formed in the bottom surface 80 of flange 74 adjacent to the inner periphery of the flange. A deformable sealing ring 82, formed of a suitable material, such as an elastomer, plastic, soft metal, or the like, is mounted in the recess 78. The sealing ring is retained in the recess by any suitable fastening means, not shown. A downwardly extending lip 88 is formed on the flange 74 inside the sealing ring 82 to protect the element 82 from damage due to liquid passing through the valve.

The foot valve 16 comprises a relatively flat circular plate 90 formed with a central, upwardly extending hub 92. The plate 90 has upstanding ribs 94 at spaced intervals therearound carrying a shroud fitting 96 which abuts the bottom of the pump and motor unit 30 when the latter is seated on the foot valve. The plate 90, ribs 94, and fitting 96 form the valve poppet of the foot valve. A plurality of vertically extending spring guides 98 are mounted in the outer region of the foot valve plate 90 at circumferentially spaced intervals around the plate, only one of such guides being illustrated in FIG. 2. A retainer 100 is fixedly mounted by a pin 102 to the upper end of each guide 98. A bearing grommet 104 is mounted in the flange 74 for each of the bolts 98. Each spring 18 is in the form of a coil spring which extends between the grommet 104 and retainer 100. The springs 18 bias the foot valve poppet in the upward direction. An annular sealing lip 106 is integrally formed on the upper surface of the plate 90 coaxial with the axis of the housing 70 and concentric with the sealing ring 82. The springs 18 bias the lips 106 into sealing engagement with the sealing ring.

Should the installation require filling of the storage reservoir through the casing 14, means may be provided on the foot valve 16 to assure that the poppet will not flutter during the filling operation or during a casing purge operation. To this end, there is provided a flat bottom structure 110. The bottom structure 110 may be simply in the form of a circular plate coaxial with the axis of the housing 70 and casing 14. Preferably, however, in order to save material, the bottom structure is in the form of a wheel comprising a central hub 112 with a circular rim 114 concentric with and spaced from the hub. A plurality of spoke elements 115 connect the rim to the hub, only one being seen in FIG. 2. A plurality of upwardly extending support webs 116 are integrally formed on the rim 114. The upper ends of these webs extend through radially extending slots 118 in the outer periphery of the foot valve plate 90 and abut the lower surface of the flange 74. The bottom structure 110 is fixed to the flange 94 by means of screws 120 which thread into the upper ends of the support webs 116. By this arrangement, the bottom structure 110 is firmly attached to the lower end of the casing 14 yet the foot valve poppet is free to move vertically. When the poppet is in its fully open position, the poppet rests firmly against the flat bottom structure which reduces fluttering of the poppet.

Guide means, generally designated 122, is provided between the flat bottom structure 110 and the foot valve to assure that no fluttering of the poppet occurs. Such guide means includes a vertically extending cylindrical bearing guide 124 mounted centrally within the hub 112 of the structure 110. This guide is preferably formed of bronze. The guide slidably receives a rod 126 having a head 128 which is fixed to the hub 92 of the valve plate 90 by means of screws 130, only one being shown. As will be appreciated, the rod 126 could be mounted on the bottom structure 110 and the cylindrical guide 124 on the foot valve 16. In any event, the cooperating rod and cylindrical guide assures that the foot valve moves vertically without fluttering. The structure of the foot valve described so far is generally the same as that disclosed in the aforementioned Haesloop patent.

According to the present invention, the plate 90 is provided with a second annular sealing lip 106' which is integrally formed on the upper surface of the plate. The lip 106' has a greater diameter than the lip 106 and surrounds the lip 106 in concentric relationship therewith. The lips are spaced from each other to provide an annular space 134 therebetween. The lip 106' is positioned on the plate so as to sealingly engage the sealing ring 82 when the foot valve is in its normally closed position as seen in FIG. 2.

An annular channel 136 is provided in the bottom of the recess 78 concentric with the annular space 134 between the sealing lips. The sealing ring 82 contains a plurality of vertically extending openings 138 aligned with the channel 136 and the annular space 134. The openings thereby provide flow communication between the channel 136 and the space between the sealing lips 106, 106'. A port 140 extends from the channel 136 to the outer surface of the housing 70. The port 140 is connected by a line 142 to a source of purge gas 144, such as nitrogen. A valve 146 is provided in the line 142 for controlling the flow of purge gas from the source 144 to the port 140. If desired, a pressure regulator may be incorporated into the valve 146.

As will be appreciated, when the pump and motor unit 30 is mounted in the casing so as to rest on top of the foot valve 16, the valve will open allowing the liquid to be discharged from the reservoir upwardly through the casing 14. To close the casing, the pump and motor unit is lifted upwardly therein allowing the foot valve to close under the force of the springs 18. When the foot valve is in its closed position, the sealing lips 106, 106' sealingly engage the sealing ring 82 thereby closing the annular space 134 therebetween. Thereafter, the valve 146 may be opened either manually or automatically to introduce purge gas through the port 140 into the channel 136. The purge gas will flow from the channel 136 through the openings 138 in ring 82 into the annular space 134 thereby providing a purged double seal which prevents any leakage whatsoever of gas from the reservoir through the foot valve and casing to the external environment.

The valve or regulator 146 may be controlled to provide either sufficient pressure to just maintain an inert gas in the space 134 or to continuously purge the space by providing a higher pressure.

While the valve assembly illustrated in FIG. 2 embodies a deformable sealing ring 82, if desired, the ring could be eliminated and the down end of housing 70 lapped flat to provide a valve seat. In this case, the sealing lips 106, 106' would engage the lapped flat seat. In such an arrangement, the poppet would be free to float slightly in the plane of lapped valve seat to the extent that the lips will seal to the seat.

Figure 3:
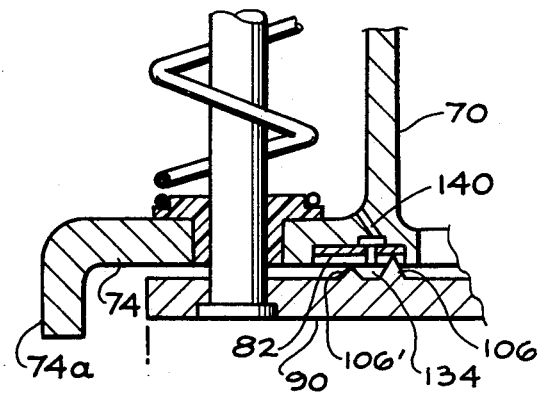
FIG. 3 is a fragmentary sectional view through a modified form of the foot valve illustrated in FIG. 2.

Reference is now made to FIG. 3 which illustrates a modification of the embodiment illustrated in FIG. 2. Like numbers are used to designate like or corresponding parts. In FIG. 3, the outer sealing lip 106' is shorter or has a lower profile than the inner lip 106 to insure that purge gas flows back to the reservoir rather than leaks into the casing 14. The flange 74 on housing 70 may be formed with a shroud 74a at its perifery of valve plate 90 which helps keep liquid out of seal area between lips 106, 106'.

Figure 4:
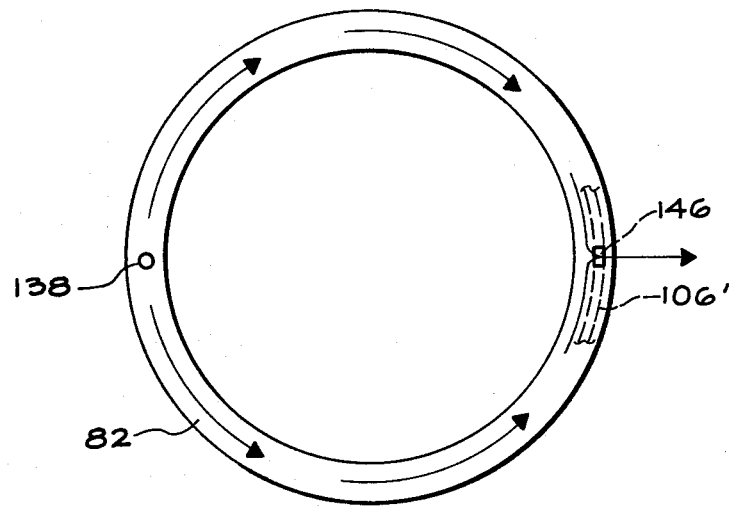
FIG. 4 is a top plan view of a modified sealing ring and sealing lip arrangement for the valve of FIG. 2.

FIG. 4 illustrates a further modification of the embodiment illustrated in FIG. 2. In FIG. 4 the sealing ring 82 has only one opening 138 on one side through which purging gas enters from port 140. A notch 146 (shown schematically in FIG. 4) is formed in the outer sealing lip 106' on the side opposite to the opening 138. This arrangement permits a uniform flow of purge gas in two paths, as indicated by the arrows, through the space 134 between the sealing lips, and outwardly into the reservoir through the notch 146.

Figure 5:
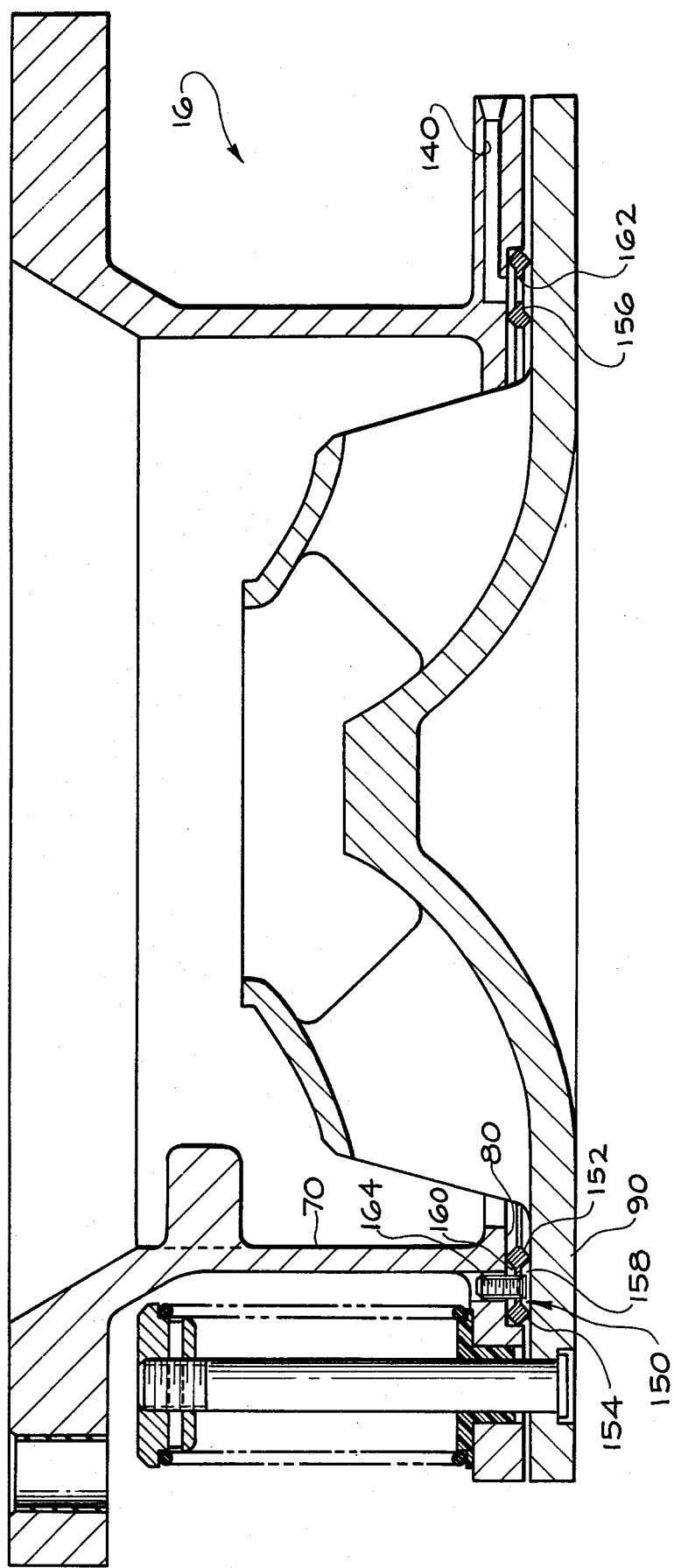
FIG. 5 is an enlarged partial sectional view of another embodiment of a foot valve in accordance with the present invention, shown in its normally closed position.

Reference is now made to FIG. 5 of the drawings which shows another embodiment of the present invention, wherein the basic structure is as previously described in connection with FIG. 2 and like numbers are used to indicate like or corresponding parts. The embodiment illustrated in FIG. 5 differs from that illustrated in FIG. 2 in that it does not embody the flat bottom structure 110 and the guide means 122. Otherwise, the foot valves disclosed in the two figures function in essentially the same manner. The purged double seal illustrated in FIG. 5 differs somewhat from the employed in the embodiment illustrated in FIG. 2. More specifically, a separate sealing element 150 is provided between the upper surface of the valve poppet of the foot valve 16 and the lower surface 80 of the housing 70. The sealing element 150 is formed of a deformable material, such as an elastomer or plastic, and comprises inner and outer sealing lips 152 and 154, respectively, joined by a web 156. It is noted from FIG. 5 that the sealing lips 152 and 154 each has a generally diamond shaped cross-section. The web 156 has a vertical thickness somewhat less than the height of the sealing lips and is connected to the lips intermediate their upper and lower edges so that two annular spaces 158 and 160 are provided between the lips on opposite sides of the web. A plurality of openings 162 are provided in the web 156 providing flow communication between the spaces 158 and 160. Preferably, the sealing element 150 is secured to the lower end 80 of housing 70 by means of screws 164 which extend through selected openings 162 in the web 156, only one such screw being seen in FIG. 5. A purge gas port 140 extending from the space 160 to the outside of the housing 70 is adapted to be connected to a source of purge gas in the same manner as in the embodiment illustrated in FIG. 2. It will be appreciated that when purge gas is introduced through the port 140, it will enter into both spaces 160 and 158 between the sealing lips 152 and 154 thereby providing a zero leakage seal for the foot valve. This embodiment of the invention has the advantage over that previously described herein in that the sealing lips may be replaced if worn since they are formed on a separable sealing element 150.

In the embodiment of FIG. 5, the upper surface of the valve poppet and lower surface 80 of the housing 70 may be lapped flat and parallel to each other and the sealing element could then be formed of a nondeformable material. In this version, the upper and lower edges of the lips 152 and 154 would preferably be flattened for sealingly engaging the lapped surfaces on the poppet and housing.

Figure 6:
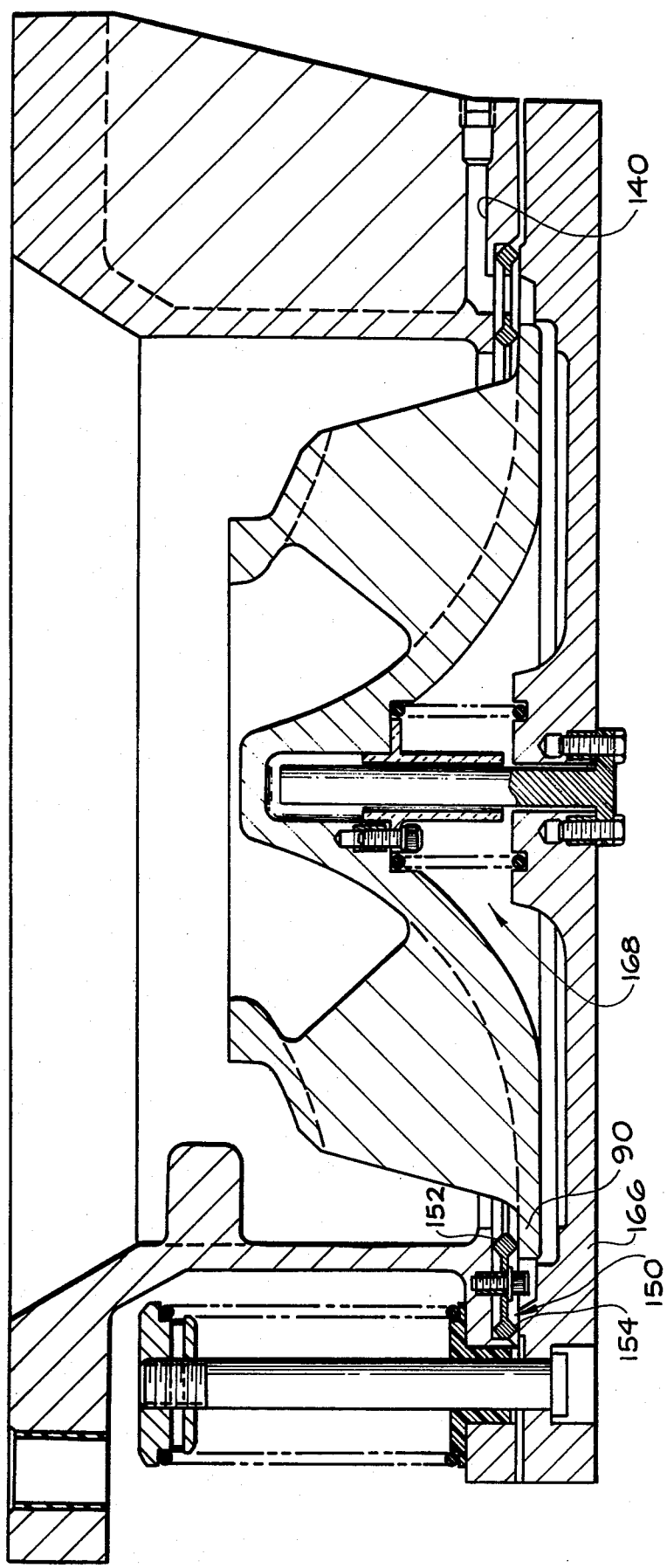
FIG. 6 is an enlarged partial sectional view of still a further embodiment of the foot valve of the present invention, shown in its normally closed position, and incorporating a double poppet valve element rather than a single poppet valve element as in the first two embodiments of the invention.

Reference is now made to FIG. 6 of the drawings which illustrates still a further embodiment of the invention. This embodiment is similar to that illustrated in FIG. 5. Like numbers are used to indicate like or corresponding parts. In the embodiment illustrated in FIG. 6, the sealing element 150 is identical to that previously described in connection with FIG. 5. The foot valve poppet element, however, differs from that illustrated in FIG. 5 in that it constitutes two parts providing two annular plates 90 and 166 which are movable relative to each other by means of a suitable guide arrangement 168, which is similar to the guide means 122 of FIG. 2. It is noted that the plate 90 has a relatively small diameter, and is dimensioned to engage the sealing lip 152 while the plate 166 sealingly engages the lip 154. Thus, the embodiment illustrated in FIG. 6 incorporates a double poppet valve arrangement which, in combination with the purged double seal 150, provides a zero leakage foot valve. Thus, the purged double seal of the present invention may be utilized with a foot valve incorporating either a single poppet valve element or a double poppet valve element. It is to be understood, therefore, that the term "foot plate means" of the foot valve element utilized in the claims is intended to embrace both a single foot valve element as illustrated in FIGS. 2 and 5 and a double foot valve element as illustrated in FIG. 6.

What is claimed is:

1. A purged valve assembly for a fluid transmitting casing of a pumping system especially suited for a cryogenic fluid storage reservoir comprising:

a cylindrical upright housing adapted to be fixed to the bottom of said casing;

a foot valve element including a central portion extending upwardly into said housing and a radially extending foot plate means underlying the lower end of said housing;

substantially concentric, spaced inner and outer annular sealing lips between the upper surface of said foot plate means and said lower end of said housing, said lips defining an annular space therebetween;

means normally holding said foot valve element upwardly against said housing to cause said lips to provide a double seal between said foot plate means and said lower end of said housing; and a port in said housing extending from the bottom thereof between said lips to the exterior of said housing for allowing the introduction of purge gas into said annular space.

2. A purged valve assembly as set forth in claim 1 wherein:
said port introduces purge gas into only one side of said annular space; and
a notch is formed in said outer sealing lip on the side thereof generally opposite to said one side to permit uniform flow of purge gas from said port in two paths through said annular space and outwardly through said notch.

3. A purged valve assembly as set forth in claim 1 wherein:
said outer sealing lip is shorter than said inner sealing lip.

4. A purged valve assembly as set forth in claim 1 wherein:
said lips are integrally formed on the upper surface of said foot plate means.

5. A purged valve assembly as set forth in claim 4 including:
an annular channel in the lower end of said housing concentric with said annular space, said port opening into said channel;
a deformable ring on said lower end of said housing underlying said channel and engageable by said lips; and
at least one opening in said ring providing flow communication between said port and said annular space.

6. A purged valve assembly as set forth in claim 1 wherein:
an annular web interconnects said lips providing an integral sealing element separable from said foot plate means and said housing.

7. A purged valve assembly as set forth in claim 6 including:
openings in said web.

8. A purged valve assembly as set forth in claim 6 including:
means connecting said sealing element to the lower end of said housing.

9. A purged valve assembly as set forth in claim 6 wherein:
said web has a vertical thickness less than the height of said sealing lips and is connected to said lips intermediate the upper and lower edges thereof.

10. A purged valve assembly for a fluid transmitting casing of a pumping system especialy suited for a cryogenic fluid storage reservoir comprising:
a cylindrical upright housing adapted to be fixed to the bottom of said casing;
a foot valve element including a central portion and a radially extending foot plate means underlying the lower end of said housing;
generally concentric, spaced inner and outer annular sealing lips between the upper surface of said foot plate means and said lower end of said housing, said lips defining an annular space therebetween;
spring means biasing said foot valve element upwardly toward said housing to a closed position causing said lips to provide a double seal between said foot plate means and said lower end of said housing; and
means providing flow communication to said annular space when said foot valve element is in said closed position to the introduction of purge gas into said annular space.

11. A method of providing a seal between a reservoir and the exterior environment to prevent leakage of gas from the reservoir to said environment, comprising the steps of:
providing a casing in said reservoir extending from the top to a bottom portion of the reservoir, an opening at the upper end of said casing, valve means for closing the bottom of said casing, said valve means having a double concentric seal defining an annular space therebetween; and
introducing a purging gas into said annular space while said valve means is closed to prevent leakage of gas from said tank through said casing.

12. A purged valve assembly for a fluid transmitting casing of a pumping system especially suited for a cryogenic fluid storage reservoir comprising:
a cylindrical upright housing adapted to be fixed to the bottom of said casing;
a foot valve element underlying the lower end of said housing;
substantially concentric, spaced inner and outer annular sealing lips between the upper surface of said foot valve element and said lower end of said housing, said lips defining an annular space therebetween;
means for shifting said foot valve element upwardly against said housing to cause said lips to provide a double seal between said foot valve element and said lower end of said housing; and
a port communicating with said annular space for allowing the introduction of purge gas into said space.

* * * * *